United States Patent [19]

Wong et al.

[11] Patent Number: 5,138,212

[45] Date of Patent: Aug. 11, 1992

[54] BRUSH PROTECTION IN AN ELECTRIC MOTOR

[75] Inventors: Chi N. Wong, Lei King Wan; Kam S. Mok, Chai Wan, both of Hong Kong

[73] Assignee: Johnson Electric S.A., Switzerland

[21] Appl. No.: 699,692

[22] Filed: May 14, 1991

[30] Foreign Application Priority Data

May 14, 1990 [GB] United Kingdom ............... 9010726

[51] Int. Cl.$^5$ ............................................. H02K 13/00
[52] U.S. Cl. ....................................... 310/239; 310/71; 310/89; 310/91; 310/242
[58] Field of Search ............... 310/239, 241, 242, 244, 310/245, 238, 40 MM, 71, 89, 248, 91, 233, 246

[56] References Cited

U.S. PATENT DOCUMENTS

| | | | |
|---|---|---|---|
| 4,037,125 | 7/1977 | Aoki . | |
| 4,698,540 | 10/1987 | McKee . | |
| 4,851,729 | 7/1989 | Baines | 310/239 |
| 4,883,998 | 11/1989 | Lau | 310/239 |
| 4,893,043 | 1/1990 | Baines | 310/239 |
| 5,015,896 | 5/1991 | Wong | 310/71 |
| 5,034,640 | 7/1991 | Shimizu | 310/71 |

FOREIGN PATENT DOCUMENTS

| | | |
|---|---|---|
| 0038595 | 4/1981 | European Pat. Off. . |
| 2203899 | 3/1988 | United Kingdom . |
| 2201299 | 8/1988 | United Kingdom . |

Primary Examiner—R. Skudy
Attorney, Agent, or Firm—Ostrolenk, Faber, Gerb & Soffen

[57] ABSTRACT

Brush gear for an electric motor includes stops 19 which prevent the brush leaves 18 from moving too close to the commutator when brushes 18A wear down. The stops 19 are separately formed and supported in grooves 20 in an end cap 16 and secured in position by lipped ends of electrical terminals 21. The stops 19 are preferably formed of metal.

4 Claims, 1 Drawing Sheet

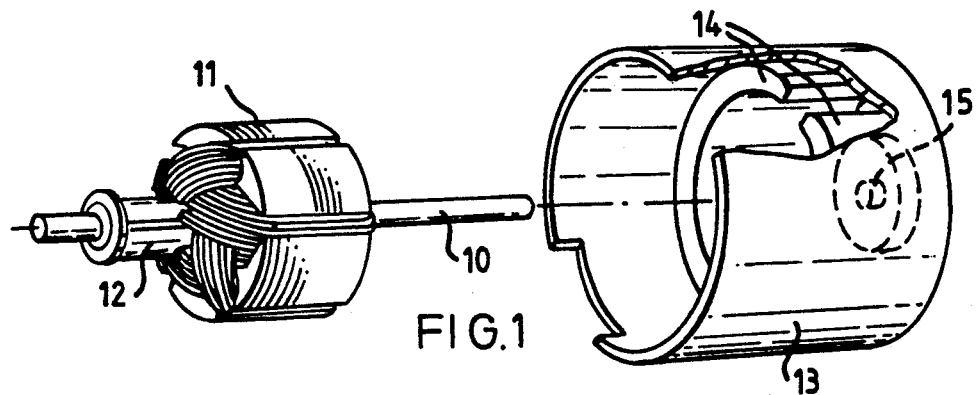
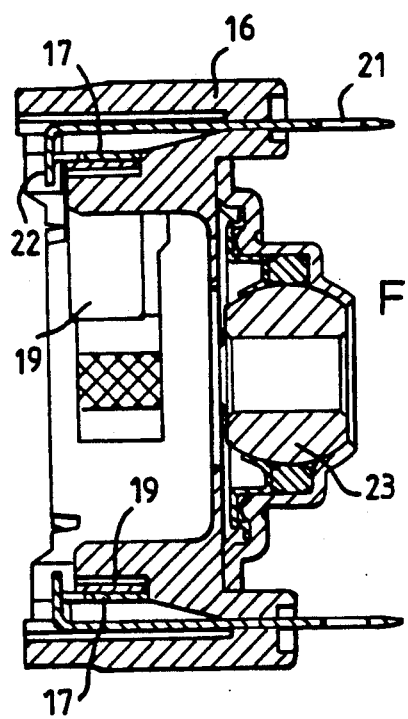
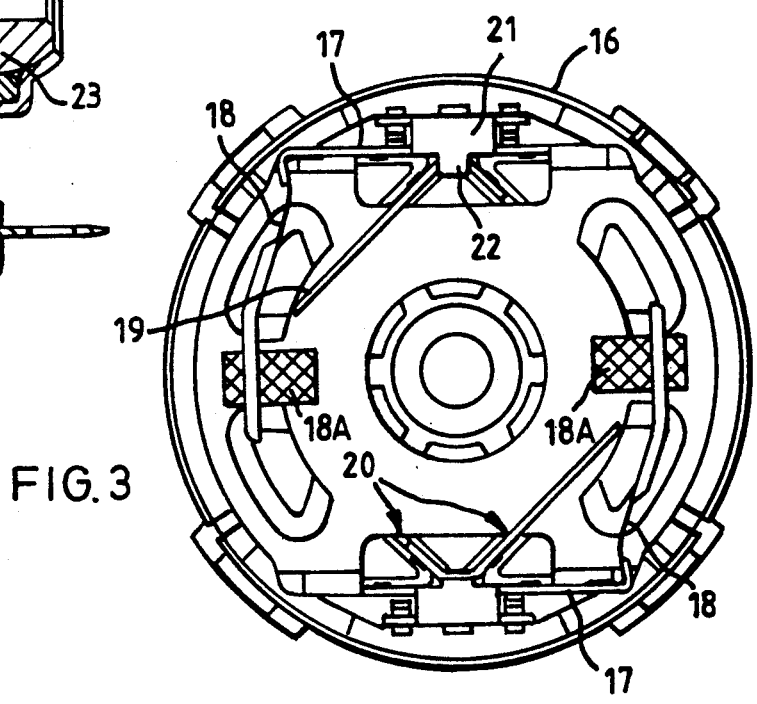

BRUSH PROTECTION IN AN ELECTRIC MOTOR

BACKGROUND OF THE INVENTION

The present invention relates to brush gear for an electric motor and in particular to an arrangement for preventing shorting between brushleaves of the motor and commutators when the brushes have worn.

Brush gear in small electric motors, particular fractional horsepower permanent magnet direct current (PMDC) motors, typically comprises a carbon brush which is carried on an end of a resilient, electrically conducting arm—the brushleaf. The brushleaf is arranged to bias the brush against a commutator on the motor shaft. Typically the brush gear is mounted in an end cap which carries a bearing for the motor shaft and forms a structural part of the motor assembly.

As a brush wears down the supporting brushleaf moves closer to the commutator. There is a danger that the brushleaf may snag on the commutator, in particular that it may catch in between segments of the commutator, and be dragged around with the rotating commutator. This may result in the brush or brushleaf making electrical contact with the other brush or brushleaf, directly or via a common commutator segment. This shorting between the brushleaves can be very dangerous, leading to the risk of fire in some PMDC motor applications.

In GB patent specification No. 2201299A an arrangement is provided in which stops are used to prevent the brush leaf approaching too closely to the commutator. The stops are formed integrally with the plastic brush holding assembly. In practice, heat generated during use of the motor can lead to instability of the plastics material of the stop parts. In some cases to overcome this problem metallic stops have been used to replace the plastic stops but this requires some manner of a secure fixing of the motor parts in position and a separate step in production or the assembly of the motor parts.

SUMMARY OF THE INVENTION

According to the one aspect of the invention there is provided an electric motor having a commutator and a pair of brush leaves each carrying a brush and biassing the brush against the commutator to make electrical contact therewith, including a stop for each brush leaf to prevent the brush leaf approaching too close to the commutator, an end cap in which the stops are mounted, and external terminals extending through the cap to make electrical connection with respective of the brush leaves which urge the stops against the end caps and hold them in position.

The stops may be L-shaped and the end caps are formed with respective grooves into which the elbows of the stops can be slidably fitted.

The stops may be formed of metallic material.

According to another aspect of the invention there is provided a method of making an electric motor having a commutator and a pair of brush leaves each carrying a brush and a stop for each brush leaf to prevent the brush leaf approaching too close to the commutator, and an end cap in which the stops are slidably mounted, and external terminals to make electrical connection with respective of the brush leaves, including the steps of fitting the stops to the end cap, passing the external terminals through the end cap to urge and hold the stops in position.

BRIEF DESCRIPTION OF THE DRAWING

A fractional horsepower direct current electric motor according to the invention will now be described by way of example with reference to the accompanying drawings in which:

FIG. 1 is an isometric part broken away view of the motor with an end cap removed;

FIG. 2 is a sectional side view of the end cap to a different scale; and

FIG. 3 is an inside end view of the end cap.

DETAILED DESCRIPTION

Referring to the drawing, in FIG. 1 the motor has a shaft 10 carrying a wound armature 11 and a commutator 12. A casing 13 has mounted therein two field magnets 14 and an end bearing 15 for supporting the shaft 10.

In FIGS. 2 and 3, a molded plastics end cap 16 which supports two brush arms. Each brush arm consists of a terminal part 17 supported in grooves in the brush holder and connected to a resilient brush supporting part or brush leaf 18. A brush 18A is supported by the free end of the brush leaf 18 and is urged in use into contact with the commutator 12. Separately farmed L-shaped rigid metallic stops 19 fit into grooves 20 formed in the end cap which embrace the elbow of each of the stops 19. Ends of each of the stops 19 extend to lie radially inwards of the respective brush leaves 18 at a position where they bear against the leaves to prevent the leaves moving too close to the outer surface of commutator 12 in use. This prevents the leaves bearing directly against the commutator when either of the brushes 19 have worn down and no longer hold the brush leaves free of the commutator surface.

An external terminal 21 for each brush is electrically connected to a respective terminal part 17 and extends through and is secured in position by an interference fit in the plastics end cap. The terminals 21 have lips 22 which bear against the elbows of the stops 19 and hold them securely in the grooves 20 of the end cap. An end bearing 23 is mounted to the end cap and supports one end of the shaft 10.

It will be noted that the stops 19 are supported in the chosen correct orientation by the grooves 20 of the holder, the grooves gripping around the elbow of each stop, and that the stops are held against the end cap by the lips 22. In this way, the stops 19 are held in the correct position without the provision of plastic barbs or protrusions in the brush holder for example. Barbs and the like would suffer from the disadvantage of providing at least a somewhat unreliable fixing method if the end cap is subjected to heat as would be normal during use of the motor.

The lips 22 may take other forms and can for example be provided as 'swollen' or thickened ends of the terminals. Normally, however and as shown, the lips 22 are provided by turned-over end parts of the terminals 21.

To assemble the described motor, the L-shaped stops 19 are fitted, sliding their elbows into the grooves 20 provided in the end cap. The terminals 21, rigidly connected to the terminal part 17 and fitted with the brush leaves 18 and brushes 18A already connected thereto, are then pressed into slots provided in the end cap and through the end cap until the lips 22 bear against and urge the stops 19 firmly against the inside of the end cap. No machining is required and no extra steps are required to place and secure the stops 19 in position.

The terminals 21 and terminal part 17 may be integrally formed of suitable electrically conductive plate material, by stamping and bending as required.

We claim:

1. An electric motor, comprising:
    a commutator and a pair of brush leaves each carrying a brush and effective to bias the brush against the commutator to make electrical contact therewith, a separately formed stop for each brush leaf to prevent the brush leaf approaching too close to the commutator, an end cap in which the stop is directly mounted, and external terminals extending through the cap, each of the external terminals being in electrical contact with a respective one of the brush leaves and having a portion thereof which is effective to urge the stop against the end cap and hold it in position.

2. A motor according to claim 1, in which each said stop is L-shaped to provide an elbow and the end cap is formed with respective grooves into which the elbow of each said stop can be slidably fitted.

3. A motor according to claim 1, in which each said stop is formed of metallic material.

4. An electric motor having a commutator and a pair of brush leaves each carrying a brush biassing the brush against the commutator to make electrical contact therewith, including metallic stops, one of said stops for each brush leaf to prevent the brush leaf approaching too close to the commutator directly, a plastics end cap for the motor in which the stops are directly mounted, and electrical terminals which extend through and are mechanically fixed to the end cap and fixed to said brush leaves inside the end cap, in which the end cap is integrally formed with grooves into which the stops are mounted and the electrical terminals include an integral part which presses against and holds the stops in the grooves.

* * * * *